United States Patent Office 3,051,715
Patented Aug. 28, 1962

3,051,715
2-(AMINOALKYL)-3-HYDROXYPIPERIDINES
John H. Biel, Milwaukee, Wis., and Frederick F. Blicke, Ann Arbor, Mich.; said Biel assignor to Lakeside Laboratories, Inc., Milwaukee, Wis., a corporation of Delaware, and said Blicke assignor to Regents of the University of Michigan, Ann Arbor, Mich., a corporation of Michigan
No Drawing. Filed Mar. 14, 1960, Ser. No. 14,513
5 Claims. (Cl. 260—294.7)

This invention relates to novel chemical compounds and processes of preparing the same. More particularly, this invention is concerned with novel 2-(aminoalkyl)-3-hydroxypiperidines and novel processes of producing these compounds.

According to the present invention there are provided 2-(aminoalkyl)-3-hydroxypiperidines having the formula

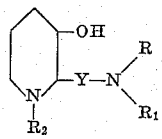

and acid addition salts and quaternary ammonium salts thereof, wherein R and $R_1$ are the same or different groups of the group consisting of hydrogen, lower alkyl groups such as methyl, ethyl, propyl, isopropyl and butyl, aralkyl groups and particularly phenyl-lower alkyl groups such as benzyl, phenethyl and phenylisopropyl, aryl groups and particularly phenyl and nuclear-substituted phenyl groups such as para-chlorophenyl, para-methoxyphenyl and para-methylphenyl, and the group

also represents heterocyclic groups such as pyrrolidino, morpholino, piperazino, a 4-lower alkyl piperazino such as 4-methylpiperazino, piperidino, hydroxypiperidino such as 3-hydroxypiperidino, 1,2,3,4-tetrahydroisoquinolino and 1,2,3,4-tetrahydroquinolino, $R_2$ is hydrogen, a lower alkyl group such as methyl, ethyl, propyl and butyl or an aralkyl group such as benzyl, phenethyl and phenylpropyl but $R_2$ is not an alkyl or aralkyl when either or both of R and $R_1$ are hydrogen, and Y is a lower alkylene and particularly methylene or ethylene.

The compounds of the above formula in which $R_2$ is hydrogen are produced by the catalytic reduction of the corresponding 2-(aminoalkyl)-3-hydroxypyridines using hydrogen and rhodium as the catalyst. This process can be represented as follows:

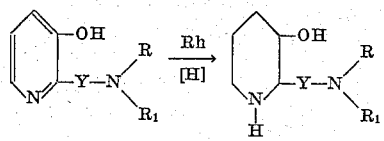

wherein Y, R and $R_1$ have the significance assigned above. Platinum, platinum oxide, palladium, palladium-on-charcoal and Raney nickel catalysts did not effect a reduction to the desired compound even at elevated temperatures and pressures.

The 2-(aminoalkyl)-3-hydroxypyridines used as starting materials are either disclosed in J. Am. Chem. Soc. 71, 2969–2972 (1949) or are readily produced by the Mannich reaction therein described. In forming the compounds in which Y is methylene, the Mannich reaction can be applied to 3-hydroxypyridine while to form those in which Y is ethylene one would use 3-hydroxy-2-methylpyridine as the reactant.

Representative of the 2-(aminoalkyl)-3-hydroxypyridines which can be used as starting materials are 2-dimethylaminomethyl-3-hydroxypyridine, 2-diethylaminoethyl-3-hydroxypyridine, 2-pyrrolidinomethyl-3-hydroxypyridine, 2-(4-methylpiperazino)-methyl-3-hydroxypyridine, 2-(morpholino)-methyl-3-hydroxypyridine, 2-(piperidino)-methyl-3-hydroxypyridine, 2-(2-tetrahydroisoquinolino)-methyl-3-hydroxypyridine, 2-(beta-dimethylamino)-ethyl-3-hydroxypyridine, 2-(beta-diisopropylamino)-ethyl-3-hydroxypyridine, 2-(beta-pyrrolidinoethyl)-3-hydroxypyridine, and 2-(beta-4-methylpiperazino)-ethyl-3-hydroxypyridine.

The reduction of such 2-(aminoalkyl)-3-hydroxypyridines can be effected at a wide range of hydrogen pressures such as from 40 p.s.i. to 3,000 p.s.i. Room temperature or slightly elevated temperatures such as up to about 75° C. are suitable for the hydrogenation. Obviously, no higher temperatures and pressures would be employed than are needed for the reduction.

If desired, the rhodium catalyst can be used deposited on a suitable inert carrier such as alumina.

The 2-(aminoalkyl)-3-hydroxypyridines are advisably reduced in the form of an acid addition salt such as the hydrochloride.

The reduction is effected in a suitable liquid reaction medium such as water or a lower alkanol and especially methanol or ethanol. Since two diastereoisomers are possible because of the presence of two asymmetric carbon atoms, the choice of solvent for the reaction medium will, in some instances at least, determine which diastereoisomeric mixture will predominate. Thus, when water is the reaction medium, a diastereoisomeric mixture is often obtained which is different from that obtained when a lower alkanol like methanol or ethanol is used under the otherwise same conditions.

Typical of the 2-(aminoalkyl)-3-hydroxypiperidines which are produced in this way are:

2-aminomethyl-3-hydroxypiperidine,
2-dimethylaminomethyl-3-hydroxypiperidine,
2-diethylaminomethyl-3-hydroxypiperidine,
2-pyrrolidinomethyl-3-hydroxypiperidine,
2-(4-methylpiperazino)-methyl-3-hydroxypiperidine,
2-(morpholino)-methyl-3-hydroxypiperidine,
2-(piperidino)-methyl-3-hydroxypiperidine,
2 - (1,2,3,4 - tetrahydroisoquinolino) - methyl - 3 - hydroxypiperidine,
2-(beta-dimethylamino)-ethyl-3-hydroxypiperidine,
2-(beta-diisopropylamino)-ethyl-3-hydroxypiperidine,
2-(beta-pyrrolidinoethyl)-3-hydroxypiperidine,
2 - (beta - 4 - methylpiperazino) - ethyl - 3 - hydroxypiperidine, and
2-(beta-aminoethyl)-3-hydroxypiperidine.

Alkylation and aralkylation of the 2-(disubstituted-aminoalkyl)-3-hydroxypiperidines yields N-alkyl and N-aralkyl derivatives thereof. Methylation of the piperidines is readily achieved by the use of a formaldehyde-formic acid mixture at an elevated temperature such as the reflux temperature.

The higher N-alkyl piperidine derivatives and the N-aralkyl piperidine derivatives are conveniently produced by reacting the free piperidine base with a reactive acylating agent such as acetyl chloride, propionyl chloride, butyryl chloride, benzoyl bromide and phenylacetyl bromide in an inert liquid reaction medium such as toluene at an elevated temperature to form an N-acyl-2-(disubstituted-aminoalkyl)-3-hydroxypiperidine followed by reduction of the amide with lithium aluminum hydride in tetrahydrofuran to form the N-alkyl and N-aralkyl derivatives of the 2-(disubstituted aminoalkyl) - 3 - hydroxypiperidines. Although the alkylation and aralkylation of the piperidine nitrogen can be effected by alkyl halides and aralkyl halides, these reactants will also simultaneously convert the 2-(disubstituted aminoalkyl) to one having a quaternary nitrogen. This method is thus not used when it is desired that both nitrogens be tertiary.

Some of the compounds which are produced as described are

N-methyl-2-dimethylaminomethyl-3-hydroxypiperidine,
N-ethyl-2-diethylaminomethyl-3-hydroxypiperidine,
N-benzyl-2-pyrrolidinomethyl-3-hydroxypiperidine,
N-propyl-2-(4-methylpiperazino)-methyl-3-hydroxypiperidine,
N-phenylethyl-2-(morpholino)-methyl-3-hydroxypiperidine,
N-methyl-2-(beta-dimethylamino)-ethyl-3-hydroxypiperidine,
N-methyl-2-(beta-diisopropylamino)ethyl-3-hydroxypiperidine,
N-methyl-2-(beta-pyrrolidinoethyl)-3-hydroxypiperidine,
N-ethyl-2-dimethylaminomethyl-3-hydroxypiperidine and
N-phenethyl-2-dimethylaminoethyl-3-hydroxypiperidine.

Acid addition salts of the described novel compounds are readily produced by contacting the piperidines with a suitable acid such as a mineral acid like sulfuric acid, hydrochloric acid and phosphoric acid, or organic acids like formic acid, citric acid, fumaric acid and maleic acid.

Quaternary ammonium salts of the tertiary piperidine derivatives are conveniently prepared by contacting the bases with alkylating agents, advisably in the presence of a suitable organic solvent. Alkylating agents such as lower alkyl halides, including methyl chloride, ethyl bromide, methyl bromide, alkylating agents like methyl and ethyl sulphate as well as aryl substituted alkylating agents like o-chlorobenzyl bromide, phenylethyl chloride and phenylpropyl bromide are representative compounds that can be used to form quaternary ammonium salts of these novel piperidines.

The tertiary bases provided by this invention are buffering agents and can be used to neutralize acid solutions and thus eliminate metallic corrosion. The compounds also can be used in the isolation of penicillin with which they form salts. The compounds having a free hydrogen on the piperidine nitrogen are also useful chelating agents for trace metals such as cobalt.

The following examples are presented to illustrate the invention.

EXAMPLE 1

*2-Dimethylaminomethyl-3-Hydroxypiperidine (Reduction in Water Solution)*

To a mixture of 152.0 g. of 2-dimethylaminomethyl-3-hydroxypyridine (1.0 mole) and 170 cc. of concentrated aqueous hydrochloric acid (2.0 mole) was added sufficient water to prepare 650 cc. of solution. The reduction was carried out with hydrogen at 2000 p.s.i. in the presence of 10.0 g. of 5% rhodium on alumina; the hydrogenation was completed in about 6 hours. The catalyst was filtered off, and the aqueous filtrate was saturated with potassium hydroxide. The alkaline mixture was extracted five times with 150 cc. aliquots of diethyl ether. The ether extracts were dried over potassium carbonate and the ether was distilled off through a 14" column. The residue was distilled through a short still head; the product distilled at 98–109° C. (9–13 mm.), yield 146.8 g. (93.0%).

The dihydrochloride salt was prepared and melted at 178–179° C. The infrared spectrum (HCl salt) showed an absorption maximum at $9.17\mu$ which is characteristic of the reduction in water and a lower melting product. The free base had a maximum at $9.8\mu$.

EXAMPLE 2

*2-Dimethylaminomethyl-3-Hydroxypiperidine (Reduction in Methanol Solution)*

To a mixture of 121.6 g. of 2-dimethylaminomethyl-3-hydroxypyridine (0.8 mole) and 136 cc. of concentrated aqueous hydrochloric acid (1.6 mole) was added sufficient methanol to prepare 650 cc. of solution. The reduction was carried out with hydrogen at 2000 p.s.i. in the presence of 10.0 g. of 5% rhodium on alumina; the hydrogenation was complete in about 1½ hours. The catalyst was filtered off, and the methanol was distilled off the filtrate under vacuum. The syrupy residue was dissolved in 350 cc. of water and the solution was saturated with potassium hydroxide. The alkaline mixture was extracted five times with 100 cc. aliquots of diethyl ether. The combined ether extracts were dried over potassium carbonate and the ether was distilled off through a 14" column. The residue was distilled through a short still head; the product distilled at 96–100° C. (9 mm.), yield 73.1 g. (57.9%).

The dihydrochloride salt was prepared and melted at 188–189° C. The infrared spectrum of the free base showed an absence of absorption maximum at $9.8\mu$ and the hydrochloride salt showed an absence of absorption at $9.17\mu$ which is characteristic of reduction in alcohol and a high melting product.

EXAMPLE 3

*N-Methyl-2-(Dimethylaminoethyl)-3-Hydroxypiperidine*

Into a 200 cc. 3-neck round bottom flask equipped with stirrer and reflux condenser was placed 39.4 g. of 2-dimethylaminomethyl-3-hydroxypiperidine (0.25 mole) reduced in water as in Example 1, 23.0 g. of a 37% formaldehyde solution (0.28 mole) and 67.5 g. of a 88% formic acid solution (1.3 moles). The solution was heated at reflux for 19 hours. After cooling to room temperature, 50 cc. of hydrochloric acid was added to the solution, and the solution concentrated to a heavy syrup by removal of the water under vacuum. The syrup was dissolved in 175 cc. of water, and the solution was saturated with potassium hydroxide. The alkaline mixture was extracted with 300 cc. of diethyl ether. The combined ether extracts were dried over potassium carbonate and the ether was distilled off through a 14" column. The residue was distilled through a 5" Vigreaux column; B.P. 98–100° C. (9 mm.), yield 38.8 g. (90.2%), $N_D^{25}$ 1.4764.

*Analysis.*—Calcd. for $C_9H_{20}N_2O$: N, 16.26. Found: N, 16.04.

EXAMPLE 4

*N-Methyl-2-(Dimethylaminomethyl)-3-Hydroxypiperidine Dihydrochloride*

To a solution of 5.2 g. of the piperidine base (0.03 mole) from Example 3 in 20 cc. of ethanol denatured with 5% methanol was added ethereal HCl to pH 1. A gummy precipitate soon separated; upon suspension in 20 cc. of warm isopropanol, the gum crystallized. The solid was recrystallized from hot ethanol to yield the product; M.P. 215–216° C., yield 5.9 g. (79.7%).

*Analysis.*—Calcd. for $C_9H_{22}Cl_2N_2O$: N, 11.43; Cl, 28.92. Found: N, 11.23; Cl, 28.84.

Various changes and modifications of the invention can be made and, to the extent that such variations incorporate the spirit of this invention, they are intended to be included within the scope of the appended claims.

What is claimed is:

1. A member of the group consisting of compounds of the formulae

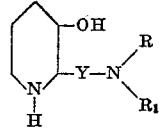

and

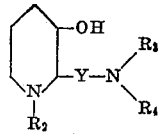

and acid addition salts thereof of the group consisting of mineral acid, formic acid, citric acid, fumaric acid and maleic acid salts and quaternary ammonium salts thereof of the group consisting of lower alkyl halide, methyl sulfate, ethyl sulfate and phenyl-lower alkyl halides in which the alkyl portion has 1 to 3 carbons, wherein R and $R_1$ are members of the group consisting of hydrogen, lower alkyl, phenyl-lower alkyl, phenyl, and groups in which

represents morpholino, pyrrolidino, piperazino, 4-lower alkyl piperazino, piperidino, hydroxypiperidino, 1,2,3,4-tetrahydroisoquinolino and 1,2,3,4-tetrahydroquinolino, $R_2$ is a member of the group consisting of lower alkyl and phenyl-lower alkyl, $R_3$ and $R_4$ are members of the group consisting of lower alkyl, phenyl-lower alkyl, phenyl, and groups in which

represents morpholino, pyrrolidino, piperazino, 4-lower alkyl piperazino, piperidino, hydroxypiperidino, 1,2,3,4-tetrahydroisoquinolino, and 1,2,3,4-tetrahydroquinolino and Y is a member of the group consisting of methylene and ethylene.

2. 2-(di-lower alkyl-amino-lower alkyl)-3-hydroxypiperidine.

3. 2-(dimethylaminomethyl)-3-hydroxypiperidine.

4. N - methyl - 2-(dimethylaminomethyl)-3-hydroxypiperidine.

5. N-lower alkyl-2-(di-lower alkyl-amino-lower alkyl)-3-hydroxypiperidine.

References Cited in the file of this patent

UNITED STATES PATENTS

| | | |
|---|---|---|
| 2,675,390 | Rosenblatt | Apr. 13, 1954 |
| 2,878,254 | Shapiro et al. | Mar. 17, 1959 |
| 2,918,470 | Krapcho et al. | Dec. 22, 1959 |
| 2,937,179 | Shapiro et al. | May 17, 1960 |

OTHER REFERENCES

Nazarov et al.: Chemical Abstracts, vol. 50: page 14743a (1956).